United States Patent
Cook et al.

(10) Patent No.: US 8,378,522 B2
(45) Date of Patent: Feb. 19, 2013

(54) MAXIMIZING POWER YIELD FROM WIRELESS POWER MAGNETIC RESONATORS

(75) Inventors: Nigel Cook, El Cajon, CA (US); Stephen Dominiak, Bern (CH); Lukas Sieber, Fribourg (CH); Hanspeter Widmer, Wohlenschwill (CH)

(73) Assignee: Qualcomm, Incorporated, San Diego, CA (US)

( * ) Notice: Subject to any disclaimer, the term of this patent is extended or adjusted under 35 U.S.C. 154(b) by 431 days.

(21) Appl. No.: 12/210,200

(22) Filed: Sep. 14, 2008

(65) Prior Publication Data

US 2009/0072627 A1 Mar. 19, 2009
US 2011/0309685 A9 Dec. 22, 2011

Related U.S. Application Data

(63) Continuation-in-part of application No. 12/018,069, filed on Jan. 22, 2008.

(60) Provisional application No. 60/972,181, filed on Sep. 13, 2007, provisional application No. 60/904,628, filed on Mar. 2, 2007.

(51) Int. Cl.
*H01F 27/42* (2006.01)
*H01F 37/00* (2006.01)
*H01F 38/00* (2006.01)

(52) U.S. Cl. ........................................... 307/104
(58) Field of Classification Search .................. 307/104, 307/149
See application file for complete search history.

(56) References Cited

U.S. PATENT DOCUMENTS

| | | | |
|---|---|---|---|
| 3,098,971 A | 7/1963 | Richardson |
| 3,480,229 A | 11/1969 | Entremont |
| 3,588,905 A | 6/1971 | Dunlavy, Jr. |
| 3,675,108 A | 7/1972 | Nicholl |
| 3,918,062 A | 11/1975 | Haruki et al. |
| 3,938,018 A | 2/1976 | Dahl |
| 3,999,185 A | 12/1976 | Polgar, Jr. et al. |
| 4,088,999 A | 5/1978 | Fletcher et al. |
| 4,388,524 A | 6/1983 | Walton |
| 4,390,924 A | 6/1983 | Nebiker, Jr. |
| 4,473,825 A | 9/1984 | Walton |
| 4,524,411 A | 6/1985 | Willis |
| 4,914,539 A | 4/1990 | Turner et al. |
| 4,959,568 A | 9/1990 | Stokes |
| 4,959,764 A | 9/1990 | Bassett |
| 5,027,709 A | 7/1991 | Slagle |
| 5,072,233 A | 12/1991 | Zanzig |
| 5,153,583 A | 10/1992 | Murdoch |

(Continued)

FOREIGN PATENT DOCUMENTS

| | | |
|---|---|---|
| DE | 4023412 | 2/1992 |
| DE | 19509918 | 9/1996 |

(Continued)

OTHER PUBLICATIONS

"Wireless Non-Radiative Energy Transfer", MIT paper, publication and date unknown, believed to be 2007.

(Continued)

*Primary Examiner* — Jared Fureman
*Assistant Examiner* — Carlos Amaya
(74) *Attorney, Agent, or Firm* — Knobbe Martens Olson & Bear, LLP (57) ABSTRACT

Magneto mechanical systems used for wireless power reception. A miniature moving magnet is placed in an oscillating magnetic field. Movement of the magnet causes power to be generated.

26 Claims, 3 Drawing Sheets

U.S. PATENT DOCUMENTS

| | | | |
|---|---|---|---|
| 5,175,561 A | 12/1992 | Goto | |
| 5,387,818 A | 2/1995 | Leibowitz | |
| 5,396,538 A | 3/1995 | Hong | |
| 5,397,962 A | 3/1995 | Moslehi | |
| 5,438,699 A | 8/1995 | Coveley | |
| 5,450,305 A | 9/1995 | Boys et al. | |
| 5,455,466 A | 10/1995 | Parks et al. | |
| 5,491,715 A | 2/1996 | Flaxl | |
| 5,519,262 A | 5/1996 | Wood | |
| 5,596,567 A | 1/1997 | Demuro et al. | |
| 5,608,417 A | 3/1997 | De Vall | |
| 5,621,322 A | 4/1997 | Ehnholm | |
| 5,654,621 A | 8/1997 | Seelig | |
| 5,684,828 A | 11/1997 | Bolan et al. | |
| 5,734,255 A | 3/1998 | Thompson et al. | |
| 5,767,601 A | 6/1998 | Uchiyama | |
| 5,796,240 A | 8/1998 | Saito et al. | |
| 5,821,638 A | 10/1998 | Boys et al. | |
| 5,856,710 A | 1/1999 | Baughman et al. | |
| 5,936,575 A | 8/1999 | Azzarelli et al. | |
| 5,963,012 A | 10/1999 | Garcia et al. | |
| 5,966,941 A | 10/1999 | Ghoshal | |
| 5,975,714 A | 11/1999 | Vetorino et al. | |
| 5,982,139 A | 11/1999 | Parise | |
| 6,016,046 A | 1/2000 | Kaite et al. | |
| 6,028,413 A | 2/2000 | Brockmann | |
| 6,031,708 A | 2/2000 | Guermeur | |
| 6,040,680 A | 3/2000 | Toya et al. | |
| 6,040,986 A | 3/2000 | Sakamoto et al. | |
| 6,104,354 A | 8/2000 | Hill et al. | |
| 6,114,834 A | 9/2000 | Parise | |
| 6,127,799 A | 10/2000 | Krishnan | |
| 6,175,124 B1 | 1/2001 | Cole et al. | |
| 6,184,651 B1 | 2/2001 | Fernandez et al. | |
| 6,265,789 B1 | 7/2001 | Honda et al. | |
| 6,275,681 B1 | 8/2001 | Vega et al. | |
| 6,291,901 B1 | 9/2001 | Cefo | |
| 6,317,338 B1 | 11/2001 | Boys | |
| 6,337,628 B2 | 1/2002 | Campana, Jr. | |
| 6,341,076 B1 | 1/2002 | Kadatskyy et al. | |
| 6,411,824 B1 | 6/2002 | Eidson | |
| 6,437,685 B2 | 8/2002 | Hanaki | |
| 6,507,152 B2 | 1/2003 | Matsumoto et al. | |
| 6,523,493 B1 | 2/2003 | Brcka | |
| 6,556,054 B1 | 4/2003 | Goodman et al. | |
| 6,633,026 B2 | 10/2003 | Tuominen | |
| 6,636,146 B1 | 10/2003 | Wehoski | |
| 6,670,864 B2 | 12/2003 | Hyvonen et al. | |
| 6,798,716 B1 | 9/2004 | Charych | |
| 6,803,744 B1 | 10/2004 | Sabo | |
| 6,879,076 B2 | 4/2005 | Long | |
| 6,891,287 B2 | 5/2005 | Moret | |
| 6,912,137 B2 | 6/2005 | Berghegger | |
| 6,960,968 B2 | 11/2005 | Odendaal et al. | |
| 6,965,352 B2 | 11/2005 | Ohara et al. | |
| 6,967,462 B1 | 11/2005 | Landis | |
| 6,972,542 B2 | 12/2005 | Patino et al. | |
| 6,972,543 B1 | 12/2005 | Wells | |
| 7,012,405 B2 | 3/2006 | Nishida et al. | |
| 7,068,991 B2 | 6/2006 | Parise | |
| 7,076,206 B2 | 7/2006 | Elferich et al. | |
| 7,095,301 B2 | 8/2006 | Hidaka et al. | |
| 7,110,462 B2 | 9/2006 | Monsen | |
| 7,116,018 B2 | 10/2006 | Strobl | |
| 7,142,811 B2 | 11/2006 | Terranova et al. | |
| 7,154,451 B1 | 12/2006 | Sievenpiper | |
| 7,164,344 B2 | 1/2007 | Deguchi et al. | |
| 7,167,139 B2 | 1/2007 | Kim et al. | |
| 7,180,265 B2 | 2/2007 | Naskali et al. | |
| 7,180,291 B2 | 2/2007 | Chmielewski et al. | |
| 7,209,792 B1 | 4/2007 | Parramon et al. | |
| 7,212,414 B2 | 5/2007 | Baarman | |
| 7,215,061 B2 | 5/2007 | Kihara et al. | |
| 7,248,165 B2 | 7/2007 | Collins et al. | |
| 7,256,532 B2 | 8/2007 | Viehland et al. | |
| 7,262,701 B1 | 8/2007 | Nguyen | |
| 7,380,150 B2 | 5/2008 | Meier et al. | |
| 7,423,518 B2 | 9/2008 | Yamada | |
| 7,511,500 B2 | 3/2009 | Schiano et al. | |
| 7,525,283 B2 | 4/2009 | Cheng et al. | |
| 7,554,316 B2 | 6/2009 | Stevens et al. | |
| 7,598,646 B2 | 10/2009 | Cleveland | |
| 7,675,197 B2 | 3/2010 | Tetlow | |
| 7,676,263 B2 | 3/2010 | Harris et al. | |
| 7,684,868 B2* | 3/2010 | Tai et al. | 607/54 |
| 7,755,552 B2 | 7/2010 | Schantz et al. | |
| 7,760,151 B2 | 7/2010 | Poilasne et al. | |
| 7,777,396 B2 | 8/2010 | Rastegar et al. | |
| 7,825,543 B2 | 11/2010 | Karalis et al. | |
| 7,839,124 B2 | 11/2010 | Yamazaki et al. | |
| 7,844,306 B2 | 11/2010 | Shearer et al. | |
| 7,868,482 B2 | 1/2011 | Greene et al. | |
| 7,885,050 B2 | 2/2011 | Lee | |
| 8,055,310 B2 | 11/2011 | Beart et al. | |
| 8,159,412 B2 | 4/2012 | Yun et al. | |
| 2001/0012208 A1 | 8/2001 | Boys | |
| 2001/0026244 A1 | 10/2001 | Ieda et al. | |
| 2001/0029167 A1 | 10/2001 | Takeda et al. | |
| 2002/0017979 A1 | 2/2002 | Krause et al. | |
| 2002/0036977 A1 | 3/2002 | Lenssen et al. | |
| 2002/0057161 A1 | 5/2002 | Katsura et al. | |
| 2002/0057584 A1 | 5/2002 | Brockmann | |
| 2002/0160722 A1 | 10/2002 | Terranova et al. | |
| 2002/0190908 A1 | 12/2002 | Andrews et al. | |
| 2003/0090353 A1 | 5/2003 | Robinson et al. | |
| 2003/0162566 A1 | 8/2003 | Shapira et al. | |
| 2003/0174099 A1 | 9/2003 | Bauer et al. | |
| 2003/0193438 A1 | 10/2003 | Yoon | |
| 2003/0199778 A1* | 10/2003 | Mickle et al. | 600/509 |
| 2004/0001029 A1 | 1/2004 | Parsche et al. | |
| 2004/0130425 A1 | 7/2004 | Dayan et al. | |
| 2004/0150521 A1 | 8/2004 | Stilp | |
| 2004/0160323 A1 | 8/2004 | Stilp | |
| 2004/0204781 A1 | 10/2004 | Hsien | |
| 2004/0212500 A1 | 10/2004 | Stilp | |
| 2004/0227002 A1 | 11/2004 | Watanabe | |
| 2004/0227057 A1 | 11/2004 | Tuominen et al. | |
| 2004/0227619 A1 | 11/2004 | Watanabe | |
| 2005/0007239 A1 | 1/2005 | Woodard et al. | |
| 2005/0017677 A1 | 1/2005 | Burton et al. | |
| 2005/0029351 A1 | 2/2005 | Yoshinaga et al. | |
| 2005/0043055 A1 | 2/2005 | Vance | |
| 2005/0057422 A1 | 3/2005 | Deguchi et al. | |
| 2005/0075697 A1 | 4/2005 | Olson et al. | |
| 2005/0104457 A1 | 5/2005 | Jordan et al. | |
| 2005/0125093 A1 | 6/2005 | Kikuchi et al. | |
| 2005/0127867 A1 | 6/2005 | Calhoon et al. | 320/108 |
| 2005/0131495 A1 | 6/2005 | Parramon et al. | 607/61 |
| 2005/0194926 A1 | 9/2005 | Di Stefano | |
| 2005/0273143 A1 | 12/2005 | Kanzius et al. | |
| 2006/0017438 A1 | 1/2006 | Mullen et al. | |
| 2006/0061325 A1 | 3/2006 | Tang et al. | |
| 2006/0071790 A1 | 4/2006 | Duron et al. | |
| 2006/0094449 A1 | 5/2006 | Goldberg | |
| 2006/0103355 A1 | 5/2006 | Patino et al. | |
| 2006/0113955 A1 | 6/2006 | Nunally | |
| 2006/0125703 A1 | 6/2006 | Ma et al. | |
| 2006/0145659 A1 | 7/2006 | Patino et al. | |
| 2006/0145660 A1 | 7/2006 | Black et al. | |
| 2006/0159536 A1 | 7/2006 | Pu | |
| 2006/0160517 A1 | 7/2006 | Yoon | |
| 2006/0164312 A1 | 7/2006 | Mathieu | |
| 2006/0208903 A1 | 9/2006 | Loh et al. | |
| 2006/0239043 A1 | 10/2006 | Ohbo | |
| 2006/0273756 A1 | 12/2006 | Bowling et al. | |
| 2007/0010295 A1 | 1/2007 | Greene et al. | |
| 2007/0046433 A1 | 3/2007 | Mukherjee | |
| 2007/0054705 A1 | 3/2007 | Liow et al. | |
| 2007/0060221 A1 | 3/2007 | Burgan et al. | |
| 2007/0082611 A1 | 4/2007 | Terranova et al. | |
| 2007/0091006 A1 | 4/2007 | Thober et al. | |
| 2007/0096910 A1 | 5/2007 | Waters | |
| 2007/0103291 A1 | 5/2007 | Adams | |
| 2007/0105524 A1 | 5/2007 | Fullam et al. | |
| 2007/0114945 A1 | 5/2007 | Mattaboni et al. | |
| 2007/0120678 A1 | 5/2007 | Posamentier | |
| 2007/0126395 A1 | 6/2007 | Suchar | |

| | | | | | | |
|---|---|---|---|---|---|---|
| 2007/0126650 | A1 | 6/2007 | Guenther | EP | 1302822 | 4/2003 |
| 2007/0135078 | A1 | 6/2007 | Ljung | EP | 1315051 | 5/2003 |
| 2007/0139000 | A1 | 6/2007 | Kozuma et al. | EP | 1003266 | 4/2006 |
| 2007/0145830 | A1 | 6/2007 | Lee et al. | EP | 1413975 | 5/2007 |
| 2007/0146218 | A1 | 6/2007 | Turner et al. | EP | 1892799 | 2/2008 |
| 2007/0156204 | A1 | 7/2007 | Denker et al. | GB | 1280516 | 7/1972 |
| 2007/0164414 | A1 | 7/2007 | Dokai et al. | GB | 1343071 | 1/1974 |
| 2007/0171681 | A1 | 7/2007 | Baarman | GB | 2070298 | 9/1981 |
| 2007/0178945 | A1 | 8/2007 | Cook et al. | GB | 2318696 | 4/1998 |
| 2007/0188326 | A1 | 8/2007 | Pluss et al. | JP | 57032144 | 2/1982 |
| 2007/0205881 | A1 | 9/2007 | Breed | JP | 62071430 | 4/1987 |
| 2007/0214940 | A1 | 9/2007 | Stoneback | JP | 1298901 A | 12/1989 |
| 2007/0222542 | A1 | 9/2007 | Joannopoulos et al. | JP | 4115606 A | 4/1992 |
| 2007/0281625 | A1 | 12/2007 | Boys | JP | 04271201 | 9/1992 |
| 2007/0296393 | A1 | 12/2007 | Malpas et al. | JP | 5038232 A | 2/1993 |
| 2007/0298846 | A1 | 12/2007 | Greene et al. | JP | 05183318 | 7/1993 |
| 2008/0003963 | A1* | 1/2008 | Turner ............... 455/185.1 | JP | 6044207 A | 2/1994 |
| 2008/0014897 | A1 | 1/2008 | Cook et al. | JP | 06133476 | 5/1994 |
| 2008/0054638 | A1 | 3/2008 | Greene et al. | JP | 6044207 U | 6/1994 |
| 2008/0067874 | A1 | 3/2008 | Tseng | JP | 6303726 | 10/1994 |
| 2008/0074083 | A1* | 3/2008 | Yarger et al. ............. 320/137 | JP | 6327172 A | 11/1994 |
| 2008/0093934 | A1 | 4/2008 | Kato | JP | 6339232 | 12/1994 |
| 2008/0108862 | A1 | 5/2008 | Jordan et al. | JP | 8033244 A | 2/1996 |
| 2008/0122294 | A1 | 5/2008 | Simon et al. | JP | 8079976 | 3/1996 |
| 2008/0122297 | A1 | 5/2008 | Arai | JP | 8088942 | 4/1996 |
| 2008/0129147 | A1 | 6/2008 | Thiesen et al. | JP | 8130840 A | 5/1996 |
| 2008/0167755 | A1 | 7/2008 | Curt | JP | 8162689 A | 6/1996 |
| 2008/0186129 | A1 | 8/2008 | Fitzgibbon | JP | 9037475 | 2/1997 |
| 2008/0191897 | A1 | 8/2008 | McCollough ............ 340/625.22 | JP | 9182322 | 7/1997 |
| 2008/0211320 | A1 | 9/2008 | Cook et al. | JP | 10097931 | 4/1998 |
| 2008/0211455 | A1 | 9/2008 | Park et al. | JP | 10225020 | 8/1998 |
| 2008/0225564 | A1 | 9/2008 | Bohm et al. | JP | 11143600 | 5/1999 |
| 2008/0293446 | A1 | 11/2008 | Rofougaran | JP | 11191146 | 7/1999 |
| 2008/0296978 | A1 | 12/2008 | Finkenzeller et al. | JP | 11215802 A | 8/1999 |
| 2008/0309452 | A1 | 12/2008 | Zeine | JP | 11332135 | 11/1999 |
| 2009/0002175 | A1 | 1/2009 | Waters | JP | 2000078763 | 3/2000 |
| 2009/0009177 | A1 | 1/2009 | Kim et al. | JP | 2000175379 | 6/2000 |
| 2009/0026907 | A1 | 1/2009 | Davidowitz et al. | JP | 2000217279 | 8/2000 |
| 2009/0045772 | A1 | 2/2009 | Cook et al. | JP | 2001024548 A | 1/2001 |
| 2009/0051224 | A1 | 2/2009 | Cook et al. | JP | 2001197672 | 7/2001 |
| 2009/0052721 | A1 | 2/2009 | Dabrowski | JP | 2001238372 A | 8/2001 |
| 2009/0058361 | A1 | 3/2009 | John | JP | 2001264432 A | 9/2001 |
| 2009/0079268 | A1 | 3/2009 | Cook et al. | JP | 2001526374 A | 12/2001 |
| 2009/0102296 | A1 | 4/2009 | Greene et al. | JP | 2002017058 A | 1/2002 |
| 2009/0102419 | A1 | 4/2009 | Gwon et al. | JP | 2002078247 A | 3/2002 |
| 2009/0109102 | A1 | 4/2009 | Dokai et al. | JP | 2002508916 A | 3/2002 |
| 2009/0111531 | A1 | 4/2009 | Cui et al. | JP | 2002320347 | 10/2002 |
| 2009/0121713 | A1 | 5/2009 | Van Helvoort | JP | 2003173177 A | 2/2003 |
| 2009/0146892 | A1 | 6/2009 | Shimizu et al. | JP | 2003069335 A | 3/2003 |
| 2009/0167449 | A1 | 7/2009 | Cook et al. | JP | 2003189507 A | 7/2003 |
| 2009/0204170 | A1 | 8/2009 | Hastings et al. | JP | 2004187429 A | 7/2004 |
| 2009/0218884 | A1 | 9/2009 | Soar | JP | 2005045298 A | 2/2005 |
| 2009/0243394 | A1 | 10/2009 | Levine | JP | 2005137040 | 5/2005 |
| 2009/0273242 | A1 | 11/2009 | Cook | JP | 2005261187 A | 9/2005 |
| 2009/0299918 | A1 | 12/2009 | Cook et al. | JP | 2006042519 | 2/2006 |
| 2009/0308933 | A1 | 12/2009 | Osada | JP | 2006510101 A | 3/2006 |
| 2010/0013434 | A1 | 1/2010 | Taylor-Haw et al. | JP | 2006115592 A | 4/2006 |
| 2010/0068998 | A1 | 3/2010 | Zyambo et al. | JP | 2006149163 A | 6/2006 |
| 2010/0109445 | A1 | 5/2010 | Kurs et al. | JP | 2008508842 A | 3/2008 |
| 2010/0134366 | A1 | 6/2010 | Yu | JP | 2009501510 A | 1/2009 |
| 2010/0176936 | A1 | 7/2010 | Garber et al. | JP | 2010539821 A | 12/2010 |
| 2010/0277387 | A1 | 11/2010 | Schantz et al. | KR | 102000017058 | 3/2000 |
| 2010/0289331 | A1 | 11/2010 | Shionoiri et al. | KR | 1020010000674 | 1/2001 |
| 2010/0289449 | A1 | 11/2010 | Elo | KR | 1020010030472 | 4/2001 |
| 2010/0315045 | A1 | 12/2010 | Zeine | KR | 20020064451 A | 8/2002 |
| 2011/0031821 | A1 | 2/2011 | Greene et al. | KR | 10-2005-001687 | 2/2005 |
| 2011/0050166 | A1 | 3/2011 | Cook et al. | KR | 1020050019926 | 3/2005 |
| 2011/0069516 | A1 | 3/2011 | Greene et al. | KR | 20060070795 A | 6/2006 |
| 2011/0074349 | A1 | 3/2011 | Ghovanloo | KR | 10-2007-001780 | 9/2007 |
| | | | | WO | WO8807732 | 10/1988 |
| | | FOREIGN PATENT DOCUMENTS | | WO | WO9619028 | 6/1996 |
| DE | | 19729722 | 1/1999 | WO | WO9857413 A1 | 12/1998 |
| DE | | 19938460 | 2/2001 | WO | WO9930090 A1 | 6/1999 |
| DE | | 102004009896 | 9/2005 | WO | WO9950780 | 10/1999 |
| DE | | 102005053111 | 5/2007 | WO | WO9950806 | 10/1999 |
| EP | | 0568920 | 11/1993 | WO | WO0167413 | 9/2001 |
| EP | | 298707 | 9/1994 | WO | WO02060215 | 8/2002 |
| EP | | 724308 | 7/1996 | WO | WO03077364 A2 | 9/2003 |
| EP | | 773509 | 4/2002 | WO | WO2004038887 | 5/2004 |

| | | |
|---|---|---|
| WO | WO2004052563 | 6/2004 |
| WO | WO2004077550 | 9/2004 |
| WO | WO2005086279 | 9/2005 |
| WO | WO2006006636 A1 | 1/2006 |
| WO | WO2006011769 A1 | 2/2006 |
| WO | WO2006031785 | 3/2006 |
| WO | WO2007008646 A2 | 1/2007 |
| WO | WO2007048052 | 4/2007 |
| WO | WO2007077442 | 7/2007 |

OTHER PUBLICATIONS

"Efficient wireless non-radiative mid-range energy transfer", MITpaper, publication and date unknown, believed to be 2007.

"Wireless Power Transfer via Strongly Coupled Magnetic Resonances", Kurs et al, Science Express, Jun. 7, 2007.

Chunbo et al.,"Research on the topology of wireless energy transfer device", Sch. of Electr. Eng. & Autom., Harbin Inst. of Technol., Harbin This paper appears in: Vehicle Power and Propulsion Conference, 2008. VPPC '08. IEEE Issue Date : Sep. 3-5, 2008 on p. 1 Print ISBN: 978-1-4244-1848-0 Inspec Accession Number: 10394615 Digital Object Identifier : 10.1109/VPPC.2008.4677798 Date of Current Version : Nov. 18, 2008.

Dong-Gi Youn et al, "A Study on the Fundamental Transmission Experiment for Wireless Power Transmission System," 1999 IEEE Conference, TENCON 99, vol. 2, pp. 1419-1422, Sep. 1999.

Finkenzeller, "RFID Handbook: Fundamentals and Applications in Contactless Smart Cards and Identification," Second Edition, Translated by Rachel Waddington, 2003, John Wiley & Sons Ltd., pp. 106-111.

Harrist, Wireless battery charging system using radio frequency energy harvesting, Master of Science Thesis, University of Pittsburgh, 2004.

International Search Report and Written Opinion—PCT/US2008/076334—ISA/EPO—Dec. 24, 2008.

James O. McSpadden et al, "A High Conversion Efficiency 5.8 GHz Rectenna," 1997 IEEE Microwave Symposium, vol. 2, pp. 547-550, Jun. 1997.

James O. McSpadden et al, "Theoretical and Experimental Investigation of a Rectenna Element for Microwave Power Transmission," 1992 IEEE Transactions on Microwave Theory and Techniques, vol. 40, pp. 2359-2366, Dec. 1992.

Karalis et al., "Efficient wireless non-radiative mid-range energy transfer", Science Direct, Annals of Physics, 323(1),34-48, Apr. 17, 2007. doi:10.1016/j.aop.2007.04.27.

Kim et al., "Electrically Small Magnetic Dipole Antennas With Quality Factors Approaching the Chu Lower Bound", Antennas and Propagation, IEEE Transactions on Volume: 58 Issue: 6 Publication Date: Jun. 2010 pp. 1898-1906 Digital Object Identifier: 10.1109/TAP.2010.2046864.

Kim, et al., Switchable polymer-based thin film coils as a power module wireless neural interfaces, Sensors and Actuators, vol. A 136, Issue 1, May 2007 (available online Nov. 27, 2006), pp. 467-474.

Miranda et al.,"Wireless power transfer using weakly coupled magnetostatic resonators", Energy Conversion Congress and Exposition (ECCE), 2010 IEEE Digital Object Identifier: 10.1109/ECCE.2010.5617728 Publication Year: 2010, pp. 4179-4186 IEEE Conferences.

Myers, G.H.; Reed, G.E.; Thumin, A.; Fascher, S; and Cortes, L., "A transcutaneous power transformer," Trans. Amer. Soc. Artif. Inter. Organs, vol. 14, 1968, pp. 210-219.

Naoki Shinohara et al, "Experimental Study of Large Rectenna Array for Microwave Energy Transmission," 1998 IEEE Transactions on Microwave Theory and Techniques, vol. 46, pp. 261-268, Mar. 1998.

Onizuka, et al., A design methodology of chip-to-chip wireless power transmission system, Univ. of Tokyo, International Conference on Integrated Circuit Design and Technology, 2007 (ICICTD '07), IEEE, May-Jun. 2007, pp. 1-4.

Ozawa, R., et al., "Wireless Energy Transmission for Micro Aerial Vehicles Using a Microwave Phased Array," 3rd International Energy Conversion Engineering Conference, Aug. 15-18, 2005, San Francisco, CA, pp. 1-6.

Schuder J.C., et al., "High Level electromagnetic energy transfer through a closed wall", Inst.Radio Engrs. Int.Conf Record 9, pp. 119-126, 1961.

Schuder J.C.,"Powering an artificial heart:Birth of the inductively coupled-radio frequency system in 1960", Artificial organs, vol. 26, No. 11, 2002, pp. 909-915.

Tae-Whan Yoo et al, "Theoretical and Experimental Development of 10 and 35 GHz Rectennas," 1992 IEEE Transactions on Microwave Theory and Techniques, vol. 40, pp. 1259-1266, Jun. 1992.

Tsuyoshi Sekitani et al, "A Large-area Wireless Power-Transmission Sheet Using Printed Organic Transistors and Plastic MEMS Switches," Nature Materials Letter, pp. 413-417; Jan. 2007.

"Wireless Power Transfer via Strongly Coupled Magnetic Resonances", Kurs et al, scimag.org, Jul. 6, 2007.

Yates et al., "Optimal transmission frequency for ultralow-power short-range radio links", Source: IEEE Transactions on Circuits and Systems I: Fundamental Theory and Applications, v 51, n 7, 1405-13, Jul. 2004; ISSN: 1057-7122; DOI: 10.1109/TCSI.2004.830696; Publisher: IEEE, USA Author affiliation: Dept. of Electr. & Electron. Eng., Imperial Coll. London, UK.

Dudek, et al., "High permeability micro-magneto-mechanical systems," International Journal of Applied Electromagnetics and Mechanics (2007), vol. 25, pp. 103-108.

Bayrashev, Andrey, et al., "Low frequency wireless powering of microsystems using piezoelectric-magnetostrictive laminate composites," Sensors & Actuators A: Physical, Sep. 2004, vol. 114, Issue 2/3, pp. 244-249.

* cited by examiner

MAXIMIZING POWER YIELD FROM WIRELESS POWER MAGNETIC RESONATORS

This application claims priority from provisional application No. 60/972,181, filed Sep. 13, 2007, the entire contents of which are herewith incorporated by reference. This application is a continuation-in-part of U.S. patent application Ser. No. 12/018,069, filed Jan. 22, 2008, which claims the benefit of U.S. Provisional App. No. 60/904,628, filed Mar. 2, 2007. The specification of U.S. patent application Ser. No. 12/018, 069 is incorporated herein by reference in its entirety.

BACKGROUND

It is desirable to transfer electrical energy from a source to a destination without the use of wires to guide the electromagnetic fields. A difficulty of previous attempts has been low efficiency together with an inadequate amount of delivered power.

Our previous applications and provisional applications, including, but not limited to, U.S. patent application Ser. No. 12/018,069, filed Jan. 22, 2008, entitled "Wireless Apparatus and Methods", the entire contents of the disclosure of which is herewith incorporated by reference, describe wireless transfer of power.

The system can use transmit and receiving antennas that are preferably resonant antennas, which are substantially resonant with a specified transmit or receive frequency, e.g., they have values that bring them within 5%, 10%, 15% or 20% of resonance. The antenna(s) are preferably of a small size to allow it to fit into a mobile, handheld device where the available space for the antenna may be limited. An efficient power transfer may be carried out between two antennas by storing energy in the near field of the transmitting antenna, rather than sending the energy into free space in the form of a travelling electromagnetic wave. Antennas with high quality factors can be used. Two high-Q antennas are placed such that they react similarly to a loosely coupled transformer, with one antenna inducing power into the other. The antennas preferably have Qs that are greater than 1000.

SUMMARY

The present application describes transfer of energy from a power source to a power destination via electromagnetic field coupling. An embodiment uses magneto-mechanical systems for receiving the power. Embodiments describe techniques for using micro-electro-mechanical systems or MEMS for forming the magneto mechanical system.

BRIEF DESCRIPTION OF THE DRAWINGS

These and other aspects will now be described in detail with reference to the accompanying drawings, wherein.

DETAILED DESCRIPTION

Figure 1:
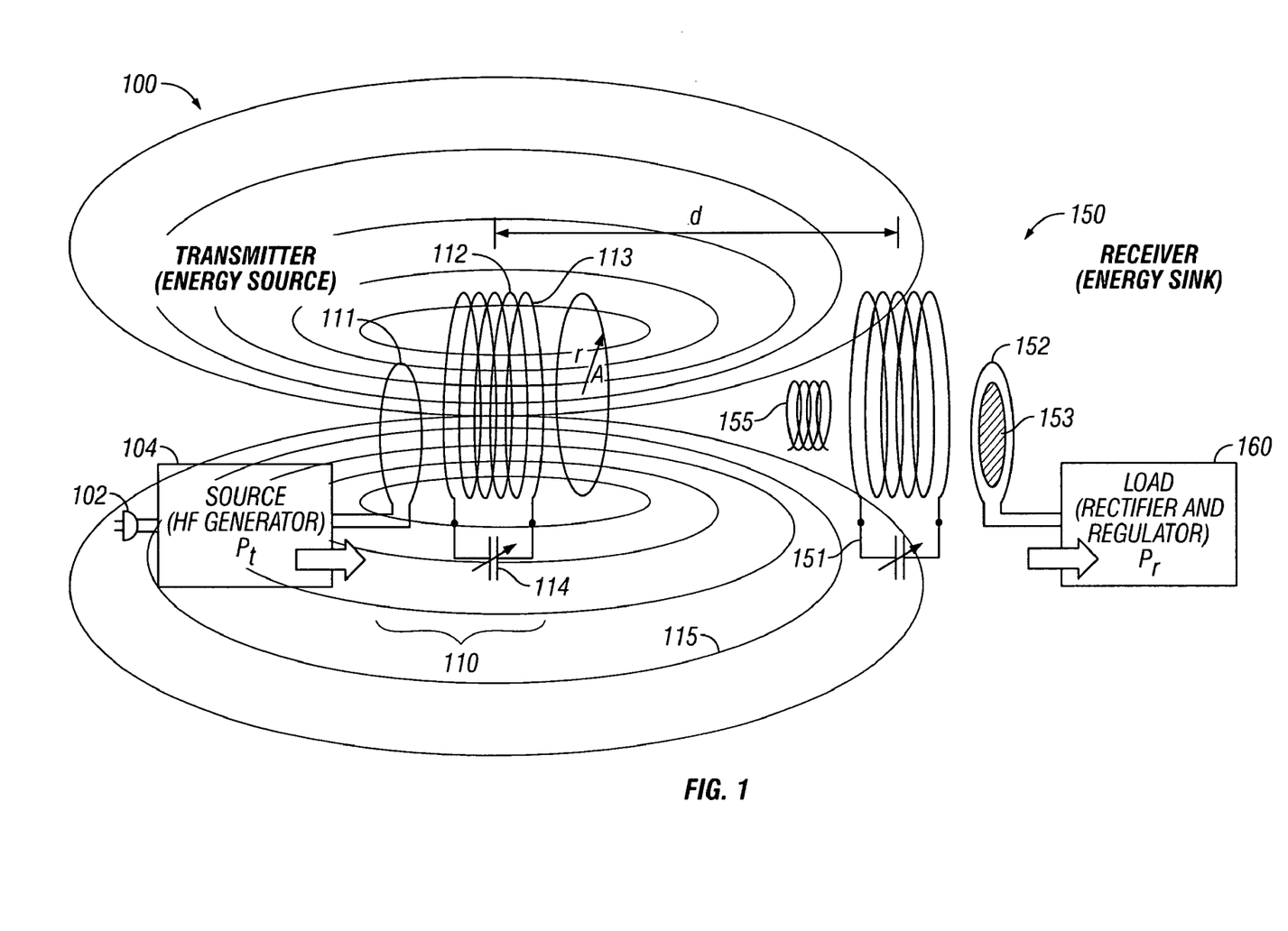
FIG. 1 shows a block diagram of a magnetic wave based wireless power transmission system.

A basic embodiment is shown in FIG. 1. A power transmitter assembly 100 receives power from a source, for example, an AC plug 102. A frequency generator 104 is used to couple the energy to an antenna 110, here a resonant antenna. The antenna 110 includes an inductive loop 111, which is inductively coupled to a high Q resonant antenna part 112. The resonant antenna includes a number N of coil loops 113 each loop having a radius $R_A$. A capacitor 114, here shown as a variable capacitor, is in series with the coil 113, forming a resonant loop. In the embodiment, the capacitor is a totally separate structure from the coil, but in certain embodiments, the self capacitance of the wire forming the coil can form the capacitance 114.

The frequency generator 104 can be preferably tuned to the antenna 110, and also selected for FCC compliance.

This embodiment uses a multidirectional antenna. 115 shows the energy as output in all directions. The antenna 100 is non-radiative, in the sense that much of the output of the antenna is not electromagnetic radiating energy, but is rather a magnetic field which is more stationary. Of course, part of the output from the antenna will in fact radiate.

Another embodiment may use a radiative antenna.

A receiver 150 includes a receiving antenna 155 placed a distance D away from the transmitting antenna 110. The receiving antenna is similarly a high Q resonant coil antenna 151 having a coil part and capacitor, coupled to an inductive coupling loop 152. The output of the coupling loop 152 is rectified in a rectifier 160, and applied to a load. That load can be any type of load, for example a resistive load such as a light bulb, or an electronic device load such as an electrical appliance, a computer, a rechargeable battery, a music player or an automobile.

The energy can be transferred through either electrical field coupling or magnetic field coupling, although magnetic field coupling is predominantly described herein as an embodiment.

Electrical field coupling provides an inductively loaded electrical dipole that is an open capacitor or dielectric disk. Extraneous objects may provide a relatively strong influence on electric field coupling. Magnetic field coupling may be preferred, since extraneous objects in a magnetic field have the same magnetic properties as "empty" space.

The embodiment describes a magnetic field coupling using a capacitively loaded magnetic dipole. Such a dipole is formed of a wire loop forming at least one loop or turn of a coil, in series with a capacitor that electrically loads the antenna into a resonant state.

An embodiment forms a receiver from a magneto mechanical system. One embodiment uses Micro Electro-Mechanical Systems (MEMS) to exploit their gyromagnetic properties. An embodiment uses materials can be used to form these magneto-mechanical systems.

MEMS is used herein to refer to any mechanical structure that forms a mechanical structure of a size of micrometers or less, e.g., using semiconductor processing techniques. According to an embodiment, MEMS is used to form switches, inductors, variable capacitors, reconfigurable antennas and antenna parts, etc.

An embodiment imitates the gyromagnetic high-Q resonance effect of YIG material, e.g. at lower frequencies. This may be used for non-radiative wireless energy transfer.

Micro magneto-mechanical systems may be formed of a plurality of micro permanent magnets each individually rotatable on an axis. The plurality may be an array or medium, of structures.

A first embodiment uses a Compass type MMS device. A second embodiment uses a Torsion type MMS device.

The compass-type MMS has a medium formed of micromagnets that are biased (saturated) by applying a static magnetic field $H_0$. The system exhibits a ferromagnetic resonance at a characteristic frequency defined by its magnetization $M_0$ and the inertial moment $I_m$ of the micromachined magnets and $H_0$.

Figure 2:
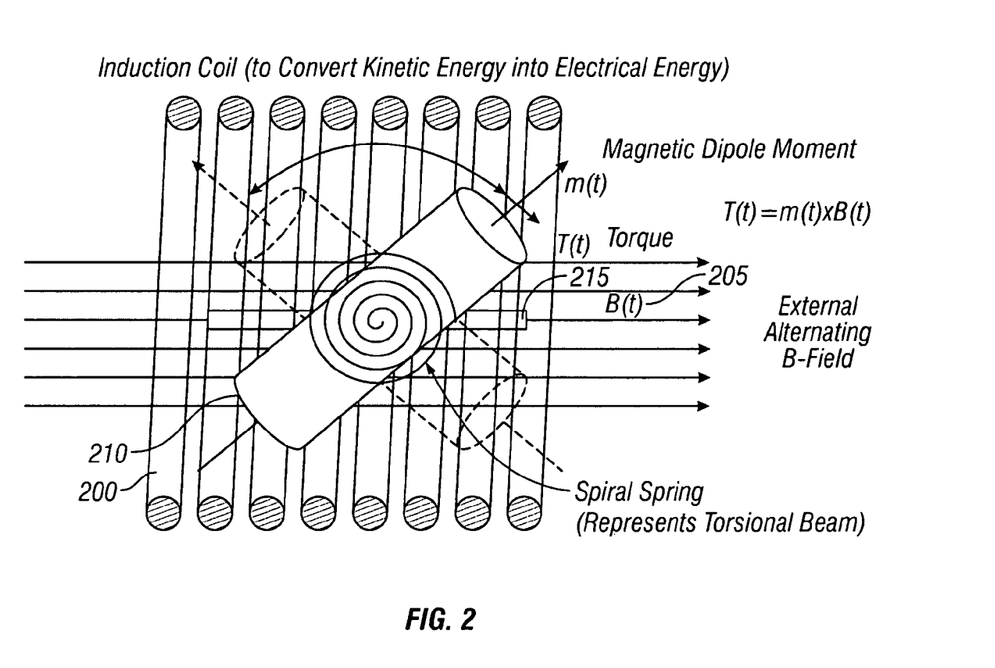
FIG. 2 illustrates an MMS embodiment.

The embodiment shown in FIG. 2 uses a torsion-type MMS with multiple micromagnets each supported by a torsional beam. This embodiment does not include a static magnetic field requirement. The system can be tuned to exhibit a ferromagnetic resonance at a characteristic frequency defined by the magnetization $M_0$ and the inertial moment $I_m$ of the micromagnets, and the spring constant of the torsional beam.

FIG. 2 shows the basic principle of a torsion type magneto mechanical system. An induction coil 200 is used to convert the kinetic energy into electrical energy. This induction coil 200 is under the influence of an external alternating magnetic field 205. The applied magnetic dipole moment causes a moment of:

$$T(t)=M(t)\times B(t)$$

This causes a magnetically oscillating bar magnet in producing the voltage in the surrounding coil 200 using the dynamo principle. A spiral spring 215 may represent the torsional beam.

In the context of power transmission, compass-type or torsion-type MEMS may be considered as
 a Ferrite that magnifies the alternating magnetic flux through the antenna wire loop (coil) preferably at the resonance frequency,
 a. high-Q resonator coupled to the transmitter via the magnetic field (the driving force is Lorentz force in contrast to L-C-type resonators based on the induction law, and/or
 a dynamo remotely driven by the transmitter through the magnetic field converting kinetic energy into electric energy.

In an embodiment, the beam 210 is radially symmetrical, e.g., sphere or disk shaped.

Figure 3:
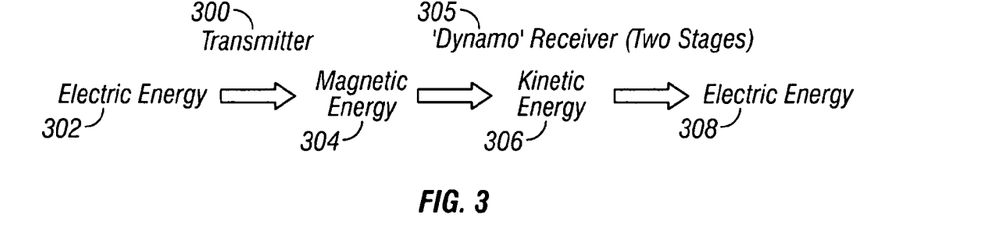
FIG. 3 illustrates the flow of energy using an MMS embodiment.

A wireless energy transfer system with a 'dynamo' receiver can carry out a system according to the diagram of FIG. 3. The transmitter 300 converts electric energy 302 to magnetic energy 304. The magnetic energy 304 is received in a dynamo receiver and converted to kinetic energy 306. The kinetic energy is converted back to electric energy and used at the receiver.

Figure 4:
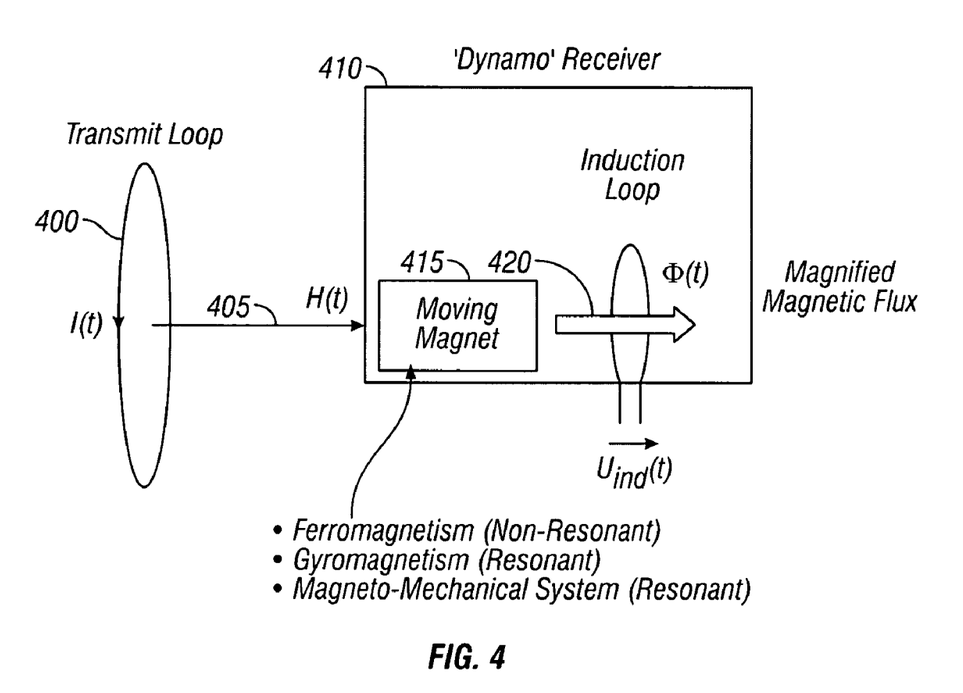
FIG. 4 shows a block diagram.

FIG. 4 shows an embodiment where a transmit loop 400 creates a magnetic field shown generally as 405.

A dynamo receiver 410 remains within the area of the magnetic field 405. The dynamo receiver includes a moving magnet 415. That moving magnet may use a non resonant ferromagnetic system, resonant gyro magnetism, and/or a magneto mechanical system e.g. a resonant system. According to an embodiment, the magnet has no dimension that is larger than 10 um, more preferably none less than 5 um or 1 um.

The output of the moving magnet creates a magnified magnetic flux 420. The flux can be expressed as $\Phi(t)$.

One problem noted in using the magnetic flux in such a moving is that the high amount of stored energy/reactive power in these magnets.

$$E_{stored} = \frac{Q_{UL}}{\omega} \cdot P_{trans} \leftarrow \text{power transferred through mechanical resonator}$$

$$P_{react} = Q_{UL} \cdot P_{trans}$$

Assumption: $Q_{loaded} = \frac{Q_{UL}}{2}$ ← Unloaded Q-factor of mechanical resonator (matching condition)

One embodiment includes a wireless power receiver device comprising a receiver portion. The receiver portion may be formed of plural electrical components, plural magnetic receiving antennas, and a power output part. At least one of the electrical components may be formed using a mechanical machining process which creates mechanical features forming the plural electrical components of 1 um or less. The feature may include an inductor. The feature may also include a capacitor. The feature may also include a magnet. The magnet may be mounted for movement under influence from an alternating magnetic field. The plural components may include an array of moving magnets. The receiver may comprise a single inductance coil shared among the array of magnets. The magnet may be radially symmetrical.

Another embodiment includes a wireless receiver comprising a first portion. The first portion includes a movable magnet located in a location to receive an alternating magnetic field. The wireless receiver also includes a magnetic part adjacent to the movable magnet and in a location where movement of the movable magnet creates energy. The first portion includes an output port for power created by the moving magnet. The receiver may further comprise a coil. The coil and the movable magnet may be each less than 10 μm in overall size. The magnet may be smaller than 2 $cm^3$. The receiver may include a plurality of magnets arranged such that their outputs sum to create a power output. The plurality of magnets may collectively occupy a space of 2 $cm^3$ or less. The plurality of magnets may be arranged in a two-dimensional array. The moving magnet may include a torsion part and a spring. The moving magnets may move under influence of the magnetic field. The wireless receiver may also comprise at least one induction coil, located adjacent to the moving magnet. The induction coil may convert kinetic energy into electrical energy. The magnet may be radially symmetrical.

Another embodiment includes a method of receiving power. The method includes locating an array of movable magnets in a location to receive an alternating magnetic field. The method further includes using the movement of the moving magnet to create energy. The method further includes using the energy created by the moving magnet to power a load in a portable electronic device. A single coil may be shared among the array of movable magnets. The coil and the moving magnets may be each less than 10 μm in overall size. Each magnet may be smaller than 2 $cm^3$. The array of magnets may be arranged in a two-dimensional array.

Another embodiment includes a wireless power transmitting device comprising a first portion. The first portion is formed of a magnetic generator and a high frequency generation system. The first portion has a number of components. At least one of the components is formed using a mechanical machining process which creates features of 1 μm or less. The features may include an inductor. The features may also include a capacitor.

Figure 5:
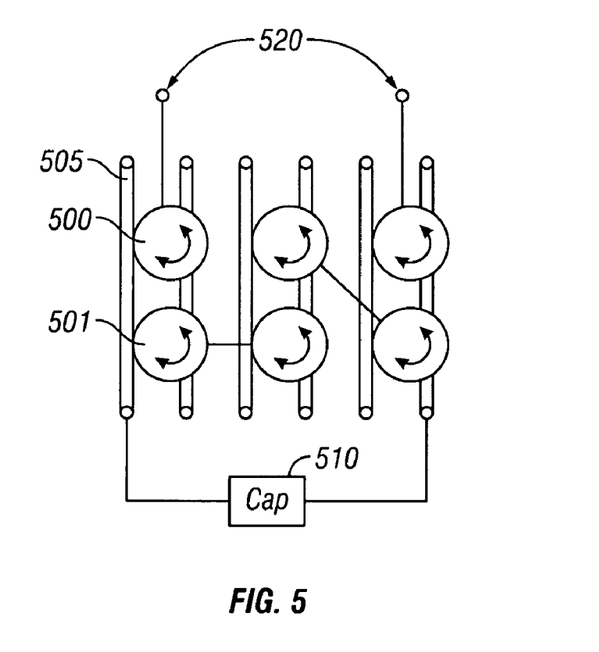
FIG. 5 shows an array of MMS devices

According to an embodiment, an array of micromechanical structures, is used as shown in FIG. 5. The array can be of any shape, e.g., a two dimensional array or a one dimensional array, or a circular array. In an embodiment, the entire array fits within a volume of approximately 2 cm³. A number of micromechanical structures such as 500, 501 is arranged in this array.

FIG. 5 shows the array 500, 501 of mechanically oscillating magnets and a single coil 505 wound around that array. Movement of the magnets transforms the kinetic oscillatory energy into electrical energy. The system exhibits a resonance that is defined by the mechanical parameters of each elementary oscillator. An external capacitor 510 added to the pick-up coil 505 is used to maintain the LC constant of this system at resonance. The power output is illustrated as a summation of all the outputs of all the magnets at 520.

The above has described using MEMS to form an array of micro sized magnetomechanical systems. Other kinds of miniature magnets, however, can alternatively be used for this purpose.

Although only a few embodiments have been disclosed in detail above, other embodiments are possible and the inventors intend these to be encompassed within this specification. The specification describes specific examples to accomplish ~ more general goal that may be accomplished in another way. This disclosure is intended to be exemplary, and the claims are intended to cover any modification or alternative which might be predictable to a person having ordinary skill in the art. For example, other sizes, materials and connections can be used. Although the coupling part of some embodiments of the antenna is shown as a single loop of wire, it should be understood that this coupling part can have multiple wire loops. Other embodiments may use similar principles of the embodiments and are equally applicable to primarily electrostatic and/or electrodynamic field coupling as well. In general, an electric field can be used in place of the magnetic field, as the primary coupling mechanism.

Also, the inventors intend that only those claims which use the-words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A wireless receiver for receiving power via a wireless field and for delivering power to a load, comprising:
    a plurality of movable magnets each configured to individually oscillate on a respective axis in the presence of an alternating magnetic field having an alternating frequency, the plurality of movable magnets configured to oscillate according to a resonant frequency that is substantially equal to the alternating frequency of the alternating magnetic field; and
    a circuit configured to receive energy generated by the plurality of movable magnets to output electrical energy to power the load, the circuit having an inductance L and a capacitance C and configured to substantially resonate at the alternating frequency of the alternating magnetic field.

2. A receiver as in claim 1, wherein the circuit comprises a coil, and wherein a size of the coil is less than 10 μm.

3. A receiver as in claim 1, wherein output power provided by each of the plurality of movable magnets sum to create a total power output.

4. A receiver as in claim 1, wherein the plurality of movable magnets collectively occupy a space of 2 cm³ or less.

5. A receiver as in claim 1, wherein the plurality of movable magnets are arranged in a two-dimensional array.

6. A receiver as in claim 1, wherein each of the plurality of movable magnets is supported by a torsion part, and wherein the circuit comprises at least one induction coil configured to convert kinetic energy of the at least one movable magnet into electrical energy.

7. The wireless receiver of claim 1, wherein each of the plurality of movable magnets has a dimension that is less than or equal to 10 micrometers.

8. The wireless receiver of claim 1, wherein the plurality of movable magnets is configured to increase an amount of alternating magnetic flux passing through the second portion.

9. The wireless receiver of claim 8, wherein the plurality of movable magnets are formed from a ferrite material.

10. The wireless receiver of claim 1, wherein the plurality of movable magnets are characterized by a quality factor of greater than 1000.

11. A power receiving system for receiving power via a wireless field and for delivering power to a load, comprising:
    a plurality of movable parts each configured to individually oscillate on a respective axis in response to the presence of an alternating magnetic field to produce kinetic energy, the alternating magnetic field having an alternating frequency, the plurality of movable parts configured to oscillate according to a resonant frequency that is substantially equal to the alternating frequency of the alternating magnetic field; and
    a cicuit configured to convert the kinetic to electric energy to power the load, the cicuit having an inductance L and a capacitance C and configured to substantially resonate at the alternating frequency of the alternating magnetic field.

12. A system as in claim 11, wherein the plurality of movable parts forms a dynamo.

13. A system as in claim 11, wherein the plurality of movable parts are arranged in a multiple dimensional array.

14. The system as in claim 11, wherein each of the plurality of movable parts has a dimension that is less than or equal to 10 micrometers.

15. The system as in claim 11, wherein the plurality of movable parts comprises a plurality of movable magnets.

16. The system as in claim 11, wherein the circuit comprising a coil and a capacitor.

17. The system as in claim 11, wherein the plurality of movable parts is configured to increase an amount of alternating magnetic flux passing through the circuit.

18. A method of wirelessly receiving power, the method comprising:
    generating a first alternating magnetic field via a plurality of movable magnets each configured to individually oscillate on a respective axis in the presence of a second alternating magnetic field having an alternating frequency, the plurality of movable magnets configured to oscillate according to a resonant frequency that is substantially equal to the alternating frequency of the second alternating magnetic field; and
    wirelessly receiving energy at a circuit using at least the first alternating magnetic field generated by the plurality of movable magnets to output electrical energy to power the load, the circuit having an inductance L and a capacitance C and configured to substantially resonate at the alternating frequency of the second alternating magnetic field.

19. The method of claim 18, wherein the circuit comprises a coil, and wherein a size of the coil is less than 10 μm.

20. The method of claim 18, wherein the plurality of movable magnets collectively occupy a space of 2 cm³ or less.

21. The method of claim 18, wherein the plurality of movable magnets is formed of a ferrite material and configured to increase an amount of alternating magnetic flux passing through the circuit.

22. A wireless receiver for receiving power via a wireless field and for delivering power to a load, comprising:
    a plurality of means for oscillating on a respective axis in the presence of an alternating magnetic field having an alternating frquency, the plurality of means for oscillating configured to oscillate according to a resonant frequency that is substantially equal to the alternating frequency of the alternating magnetic field; and
    means for wirelessly receiving energy generated by the plurality of means for oscillating to output electrical energy to power the load, the means for wirelessly receiving energy having an inductance L and a capacitance C and configured to substantially resonate at the alternating frequency of the alternating magnetic field.

23. The receiver of claim 22, wherein the means for wirelessly receiving energy comprises a coil, and wherein a size of the coil is less than 10 micrometers.

24. The receiver of claim 22, wherein the plurality of means for oscillating comprises a plurality of movable magnets, and wherein each of the plurality of means for oscillating is supported by a respective torsion part.

25. The receiver of claim 22, wherein the plurality of means for rotating collectively occupy a space of 2 cm³ or less.

26. The receiver of claim 22, wherein each of the plurality of means for oscillating is formed of a ferrite material and configured to increase an amount of alternating magnetic flux passing through the means for receiving.

* * * * *